(12) United States Patent
Klein et al.

(10) Patent No.: US 9,165,566 B2
(45) Date of Patent: Oct. 20, 2015

(54) INDEFINITE SPEECH INPUTS

(71) Applicant: Microsoft Corporation, Redmond, WA (US)

(72) Inventors: Christian Klein, Duvall, WA (US); Gregg Wygonik, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 340 days.

(21) Appl. No.: 13/749,431

(22) Filed: Jan. 24, 2013

(65) Prior Publication Data
US 2014/0207446 A1 Jul. 24, 2014

(51) Int. Cl.
*G10L 15/00* (2013.01)
*G10L 15/18* (2013.01)
*G10L 21/00* (2013.01)
*G10L 21/10* (2013.01)
*G10L 15/22* (2006.01)

(52) U.S. Cl.
CPC .............. *G10L 21/10* (2013.01); *G10L 15/1815* (2013.01); *G10L 15/22* (2013.01)

(58) Field of Classification Search
CPC ......... G10L 15/22; G10L 15/26; G06F 3/167; H04M 2201/40
USPC ......................................... 704/275, 231–257
See application file for complete search history.

(56) References Cited

U.S. PATENT DOCUMENTS

| | | | |
|---|---|---|---|
| 6,223,161 B1 | 4/2001 | Schliwa | |
| 6,477,497 B1 | 11/2002 | Aizawa et al. | |
| 6,535,854 B2 | 3/2003 | Buchner et al. | |
| 6,895,242 B2 | 5/2005 | Fu et al. | |
| 7,206,747 B1 | 4/2007 | Morgan et al. | |
| 7,386,806 B2 | 6/2008 | Wroblewski | |
| 7,499,859 B2 | 3/2009 | Lu et al. | |
| 7,774,202 B2 | 8/2010 | Spengler et al. | |
| 2003/0101060 A1 | 5/2003 | Bickley et al. | |
| 2003/0138118 A1 | 7/2003 | Stahl | |
| 2009/0164215 A1 | 6/2009 | Lu et al. | |
| 2012/0259639 A1 | 10/2012 | Yeh et al. | |

OTHER PUBLICATIONS

Libuda, Lars, "Improving Clarification Dialogs in Speech Command Systems with the Help of User Modeling: A Conceptualization for an In-Car User Interface", Retrieved at <<www.kbs.uni-hannover.de/~henze/ABIS_Workshop2001/final/Libuda_final.pdf>>, In Proceedings of the GI-Workshop "Lernen—Lehren—Wissen—Adaptivität", University of Dortmund, Oct. 2001, pp. 5.
European Patent Office, Second Written Opinion Received in PCT Patent Application No. PCT/US2014/012224, Oct. 24, 2014, 8 Pages.

(Continued)

*Primary Examiner* — Jesse Pullias
(74) *Attorney, Agent, or Firm* — Bryan Webster; Kate Drakos; Micky Minhas (57) ABSTRACT

Embodiments are disclosed that relate to the use of speech inputs including indefinite quantitative terms as computing device inputs. For example, one disclosed embodiment provides a method of operating a computing device, the method including receiving a speech input comprising an indefinite quantitative term, determining a definite quantity corresponding to the indefinite quantitative term, and applying the definite quantity to an action performed via the computing device in response to the speech input.

18 Claims, 5 Drawing Sheets

(56) References Cited

OTHER PUBLICATIONS

European Patent Office, International Search Report & Written Opinion for PCT Application No. PCT/US2014/012224, May 8, 2014, 16 Pages.

Pulasinghe, et al., "Voice-Controlled Modular Fuzzy Neural Controller with Enhanced User Autonomy", In Journal of Artificial Life and Robotics, vol. 7, Issue 1-2, Mar. 1, 2003, pp. 40-47.

Ghidary, et al., "Multi-Modal Human Robot Interaction for Map Generation", In IEEE/RSJ International Conference on Intelligent Robots and Systems, vol. 4, Oct. 29, 2001, pp. 2246-2251.

Pateras, et al., "Understanding Referring Expressions in a Person-Machine Spoken Dialogue", In International Conference on Acoustics, Speech, and Signal Processing, vol. 1, May 9, 1995, pp. 197-200.

Watanabe, et al., "Approximate Decision Making by Natural Language Commands for Robots", In 32nd Annual Conference on IEEE Industrial Electronics, Nov. 6, 2006, pp. 4480-4485.

Kawamura, et al., "Trends in Service Robots for the Disabled and the Elderly", In Proceedings of the IEEE/RSJ/GI International Conference on Intelligent Robots and Systems: Advanced Robotics and the Real World, vol. 3, Sep. 12, 1994, pp. 1647-1654.

IPEA European Patent Office, International Preliminary Report on Patentability Issued in PCT Patent Application PCT/US2014/012224, Feb. 3, 2015, 11 Pages.

INDEFINITE SPEECH INPUTS

BACKGROUND

The use of speech inputs to control computing devices may have various advantages over other input methods, as they may allow for hands-free operation and efficient navigation shortcuts. Speech inputs generally specify actions to take. For example, when operating a media player, a user may use speech commands such as "stop" and "play" to control the media player. Speech inputs also may be used to select menu items from a displayed menu, and perform other such actions.

In some instances, a speech input also may specify a quantity or other parameter that modifies the action. For example, in the media player context, a user may request the media player to "skip ahead five minutes." However, in many instances, users may find it difficult to use such parameterized speech inputs. For example, users may lack familiarity with the range of parameters that can be specified for an action, and may not know what system response to expect in response to a specified parameter. Thus, in light of these difficulties, speech input systems may be configured to have limited functionality to avoid such commands, or may utilize other input methods that facilitate such parameterized inputs (e.g. physical volume controls used in conjunction with a car entertainment system that supports speech inputs).

SUMMARY

Embodiments are disclosed that relate to the use of speech inputs that include indefinite quantitative terms. For example, one disclosed embodiment provides a method of operating a computing device, the method including receiving a speech input comprising an indefinite quantitative term, determining a definite quantity corresponding to the indefinite quantitative term, and applying the definite quantity to an action performed via the computing device in response to the speech input.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As mentioned above, the use of a parameterized speech input to perform a desired quantity of an action may pose various problems, as a user may find it difficult to specify via speech a definite quantity or degree of an action that the user wishes to perform. For example, a person listening to music that desires to increase the volume may have a hard time specifying a desired volume via definite quantitative terms, and therefore may have to guess several times to find the definite quantity that corresponds to the intended volume. As a more specific example, the user may perform speech inputs such as "volume 70%," "volume 60%," and the like until the user has identified a desired volume. This may provide an unsatisfactory user experience.

Such parameterized speech inputs may be difficult to use at least partly because a user formulating a speech input may have insufficient understanding of the available speech commands or the parameter space of the speech input. For example, a user may not have any idea of where the specific desired volume lies on the continuum between the minimum and maximum possible volumes for the system, and/or not be accustomed to thinking of volume in such terms.

Accordingly, embodiments are disclosed herein that may facilitate the use of such speech commands. Briefly, the disclosed embodiments allow a user to perform indefinite speech commands that may correspond more closely to everyday language usage than precise, definite quantitative commands such as the examples described above. The speech recognition system then makes a determination of the intent of the user based upon the indefinite speech command. For example, where the indefinite command comprises an indefinite quantitative term, the speech recognition system may determine a mapping of the indefinite quantitative term to a definite quantity, and then use the definite quantity as a parameter for a specified action. Further, where a user performs one or more additional speech commands to adjust a result of a previous speech command, the mapping of the indefinite quantitative term used to perform the previous speech command may be adjusted so that future actions in response to that speech command may potentially match the user's intent more closely. Such mappings may be determined in any suitable manner. For example, mappings may be determined during product development based upon user studies, or based upon actual product usage over time. Further, the definite quantities to which indefinite quantitative commands are mapped may change over time as user intent behind the commands becomes more evident, as described in more detail below. Such changes may be stored on a per-user basis in some embodiments, as different users may have different intents when using such commands.

In some instances, a speech command also may be indefinite in that no action is specified. As a more specific example, a user trying to skip through a video content item may specify a series of commands, such as "skip forward a little," followed some time later by "a little more." The first command specifies a definite action (skip forward) but an indefinite quantity ("a little"), while the follow-up command specifies no action and an indefinite quantity ("a little more"), but implicitly refers to the previous command specifying an action. In this particular example, the speech input system may first determine the intent of the user with regard to the quantitative term "a little" by determining a mapping of the term "a little" to a definite quantity (e.g. ten seconds, thirty seconds, one minute, or any other suitable value). The speech input system may then determine both an intended action (e.g. skip forward) and an intended quantity (e.g. five seconds, ten seconds, or any other suitable value) for the follow-up command "a little more" via information regarding the user's speech input history (e.g. by storing previous commands) and the state of the application being controlled. Further, once the user finishes the series of commands, the mapping of the originally specified term "a little" may be changed to match the overall sum of the sequence of speech inputs. In this manner, speech commands may be used in a multiple turn conversation between the user and the system.

In another example, a user may make a speech command such as "a little bigger" in the context of viewing a photograph. While this input does not specify any action, and also does not implicitly refer to a previously-specified action, contextual information regarding the state of the application currently in use may be used to disambiguate the intended action.

It will be understood that the term "action" as used herein corresponds to any action performed by a computing device in response to a speech input, and may include system and/or application control actions (e.g. skip ahead, stop, pause), as well as other types of actions (e.g. displaying information in response to a speech input requesting presentation of information regarding a particular video content item). Likewise, it will be understood that an indefinite speech input may be a compound input that includes an indefinite term input by one or more non-speech input modes, such as gesture inputs, and that disambiguating such an input may comprise determining the user's intent utilizing the input made via the other mode(s).

Figure 1:
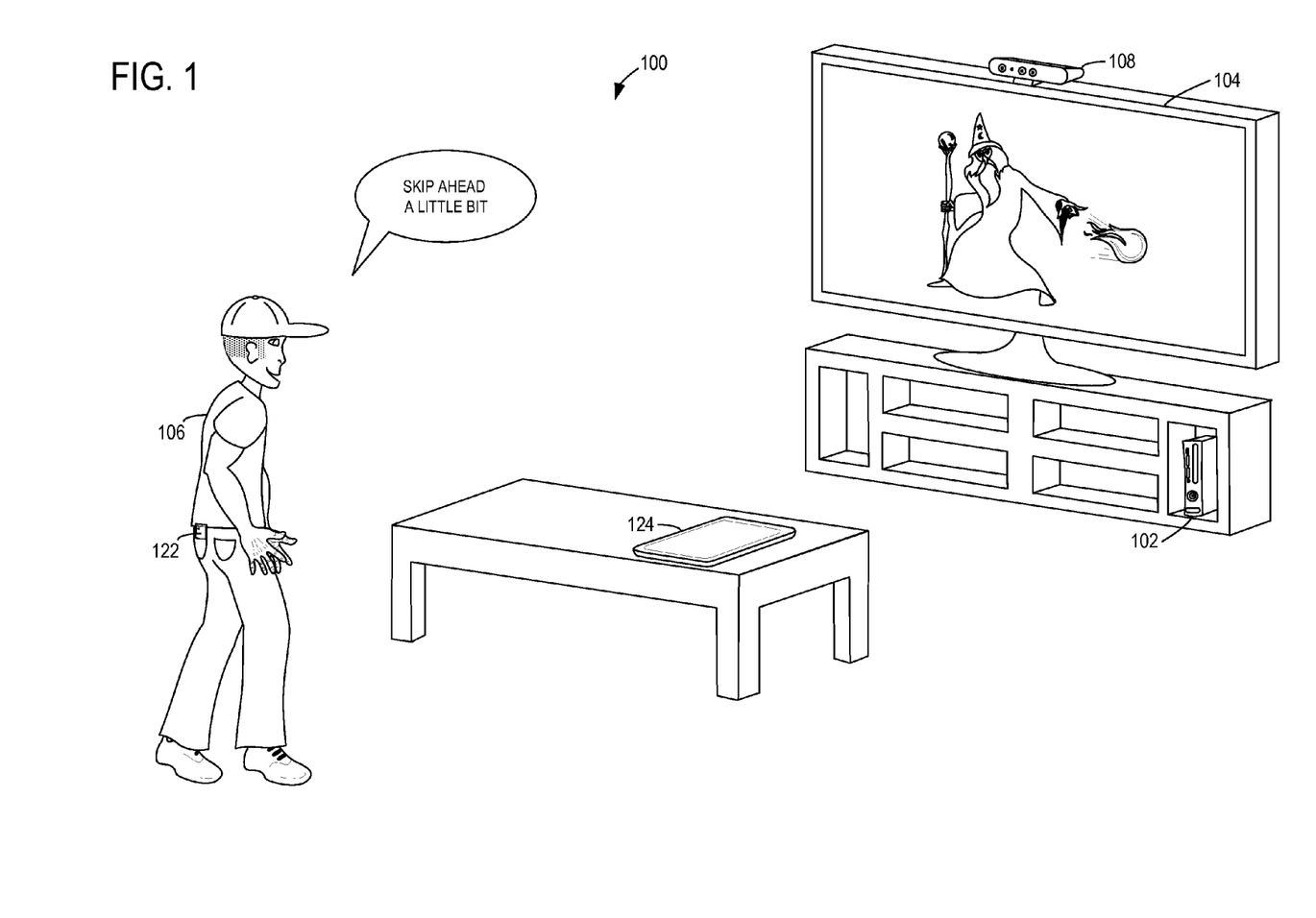
FIG. 1 shows an example embodiment of a speech input use environment, and illustrates a user performing an example of an indefinite speech input.

FIG. 1 shows an example use environment 100 for a speech input system. The use environment 100 comprises a computing device, depicted as a home entertainment console 102, in communication with a display device 104 such that the home entertainment console 102 may output video content to the display device 104. A user 106 is illustrated as interacting with the home entertainment console 102 via speech input to control the playback of a video content item displayed on the display. The user's speech inputs may be detected via a sensor system 108 comprising one or more microphones, such as a directional microphone array. Additionally, sensor system 108 may comprise one or more other suitable sensors, including but not limited to a two dimensional image sensor (e.g. an RGB or grayscale sensor), a depth image sensor (e.g. a time of flight or structured light depth sensor), a stereo camera system, and/or any other suitable sensors. Such a sensor system may allow the user to make gesture-based inputs in addition to speech inputs. Further, as described in more detail below, in some scenarios a user may make compound inputs that include both a speech component and a gesture component. While described herein in the context of a home entertainment console, it will be understood that any other suitable computing device may be used.

The depicted speech input specifies an action, "skip ahead," followed by indefinite quantitative term "a little bit," and thus comprises an ambiguity in the form of the indefinite quantitative term. It will be understood that speech inputs with quantitative terms may have various other forms of ambiguity. For example, a speech input may fail to specify an action, such as the above-described example where a user intends to further modify an action specified in a previous speech input. In such an example, the speech input may comprise either a definite quantitative term (e.g. "five minutes more"), or an indefinite quantitative term ("a little more"). While depicted herein in the context of media player commands, it will be understood that a computing device speech input having a quantitative term may be used in any suitable context.

Figure 2:
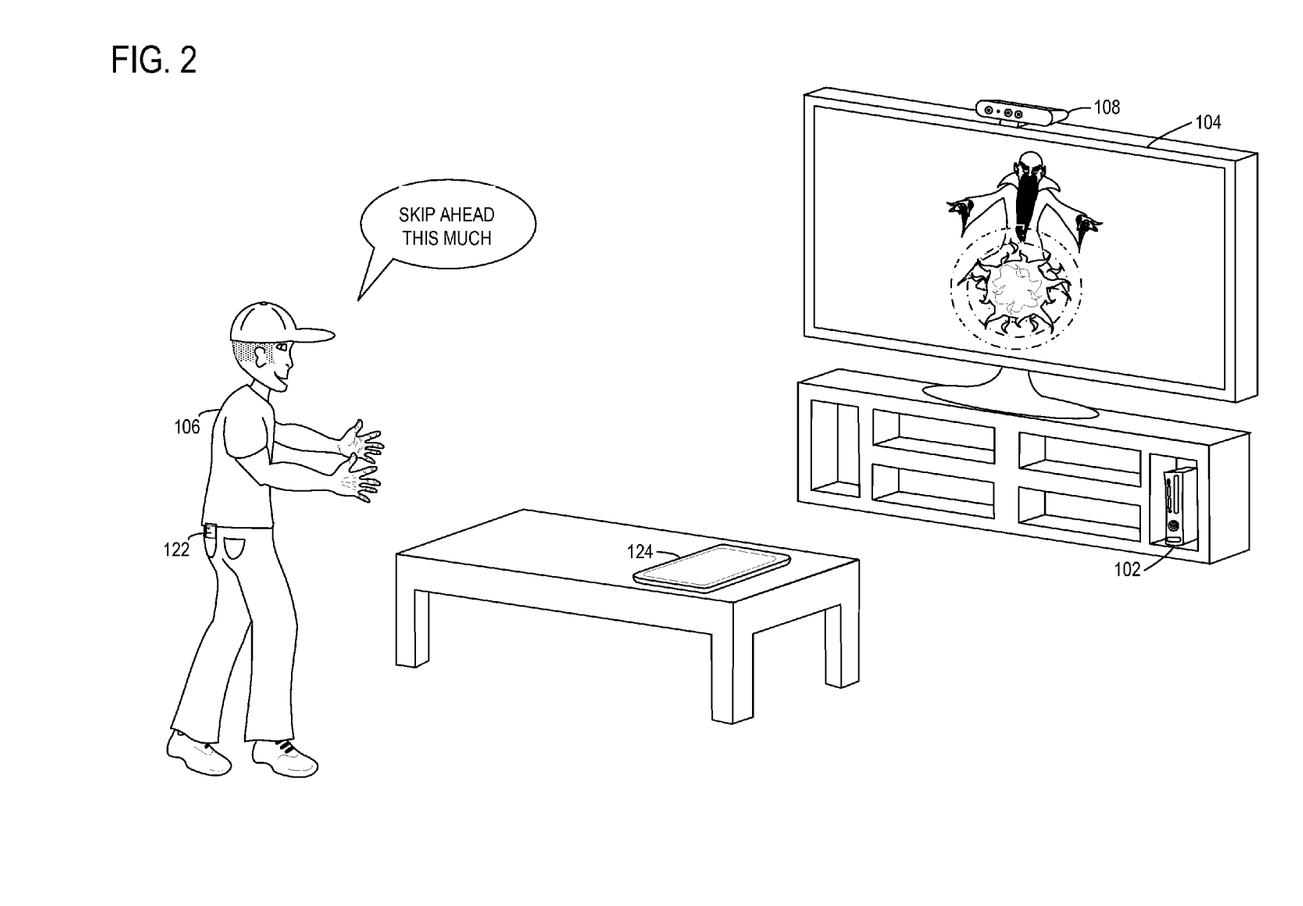
FIG. 2 illustrates a user performing another example of an indefinite speech input.

As mentioned above, in some scenarios a user may make a compound speech input that comprises a speech input and a non-speech input. For example, FIG. 2 shows a user making a compound input comprising both a speech input having an indefinite quantitative term ("this much"), and also an indefinite quantitative gesture in which the user modifies the spoken term "this much" by holding his hands a distance apart. In this example, the speech input system may disambiguate the speech input by detecting the reference to the contextual gesture, detecting the gesture input itself, and then determining a mapping of the gesture input to a definite quantity (e.g. by determining how far apart the user's hands are relative to the total span of the user's reach, and then using the relative distance to identify a definite quantity mapped to that difference). As another example of a compound input, a user may point at a displayed item and say "show me more like this one." Image data combined with information regarding what was shown at different locations on the display may be used to determine the identity of the item at which the user was pointing, and thus to identify other similar objects to show to the user. It will be understood that the term "gesture" as used herein includes, but is not limited to, motions, relative positions and postures of body parts.

Compound inputs may be received via any suitable combination of sensors. For example, in some embodiments, a user may make a compound input comprising a speech input and an input using one or more sensors on a companion device, such as a mobile phone 122, tablet computer 124, laptop computer, etc. In such a scenario, a user may use a multi-touch gesture, swipe gesture, companion device tilt, or other input to convey an indefinite quantitative term that accompanies a speech input in a similar manner to the gesture of FIG. 2.

Figure 3:
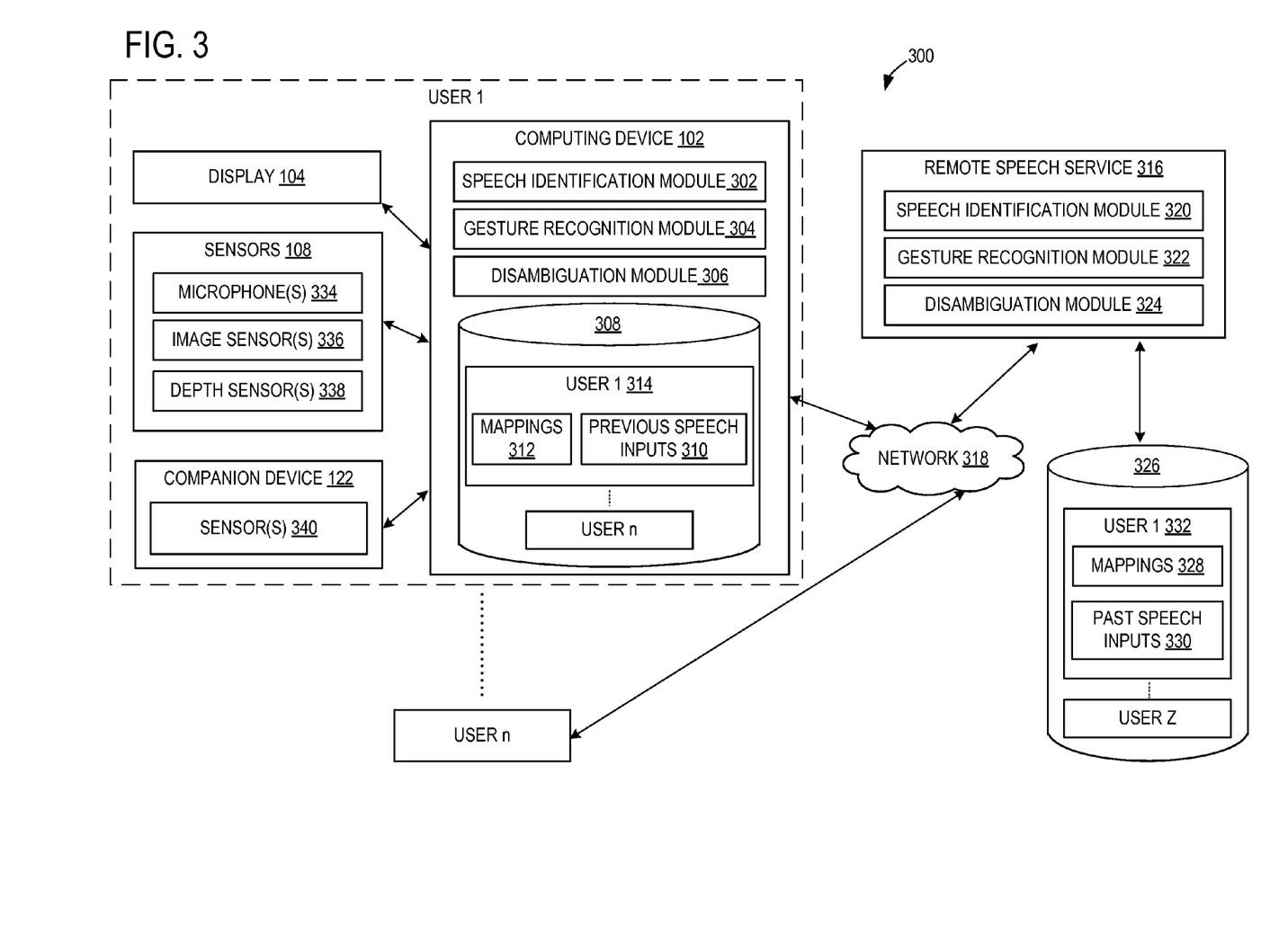
FIG. 3 shows a block diagram of an embodiment of a speech input use environment.

FIG. 3 shows a block diagram of an embodiment of a speech input environment 300 that includes computing device 102. The computing device 102 includes a speech input system that comprises various modules utilized in the identification and interpretation of speech and other input events. Such modules may include, but are not limited to, a speech identification module 302 configured to identify recognized speech segments from a user's speech inputs, a gesture recognition module 304 configured to recognize user gestures, and a disambiguation module 306 configured to disambiguate indefinite quantitative terms. The computing device 102 further may comprise storage 308. The storage 308 may be used to store information regarding previous speech inputs 310 to allow the disambiguation module 306 to disambiguate speech inputs that do not specify an action but instead modify a previously-specified action. The storage 308 also may store mappings 312 of indefinite quantitative terms to definite quantities for use by the disambiguation module 306 in disambiguating indefinite speech inputs, and/or any other suitable information. It will be understood that this information may be stored as a part of a user profile 314 for each user of the computing device, as each user may have different intents when making the same indefinite speech input, and the different intents may be learned by the computing device over time (e.g. by corrections or adjustments to a speech command made via follow-up speech commands).

It will be understood that such speech identification, gesture recognition, and disambiguation processes may be partially or fully performed at a location remote from the computing device 102. For example, FIG. 3 illustrates a remote speech service 316 accessible to the computing device 102 via a network 318. The remote speech service 316 is illustrated as comprising a speech identification module 320, a gesture recognition module 322, and a disambiguation module 324, such that the computing device 102 may send raw speech inputs for the determination of recognized speech segments, and/or may send recognized speech segments for disambiguation of indefinite quantitative terms. The remote speech service 318 is also depicted as being in communication with storage 326 in which mappings 328 of indefinite quantitative terms to definite quantities may be stored, as well as information regarding past speech inputs 330 made by users of the system. Again, it will be understood that such information may be separately stored for each user of the service, for example, within user profiles 332 for the users.

As mentioned above, the computing device 102 is configured to receive input via various sensors, such as via sensor system 108. In FIG. 3, sensor system 108 is depicted as comprising one or more microphones 334, one or more image sensors 336 (e.g. two-dimensional RGB sensor(s)), and one or more depth sensors 338. The computing device 102 also may be configured to receive sensor data from a companion device (e.g. smart phone, tablet computer, laptop computer, etc.), such as those shown at 122 and 124 in FIG. 1, having one or more sensors 340. It will be understood that these sensors are described for the purpose of example, and that any other suitable sensors may be used.

Figure 4:
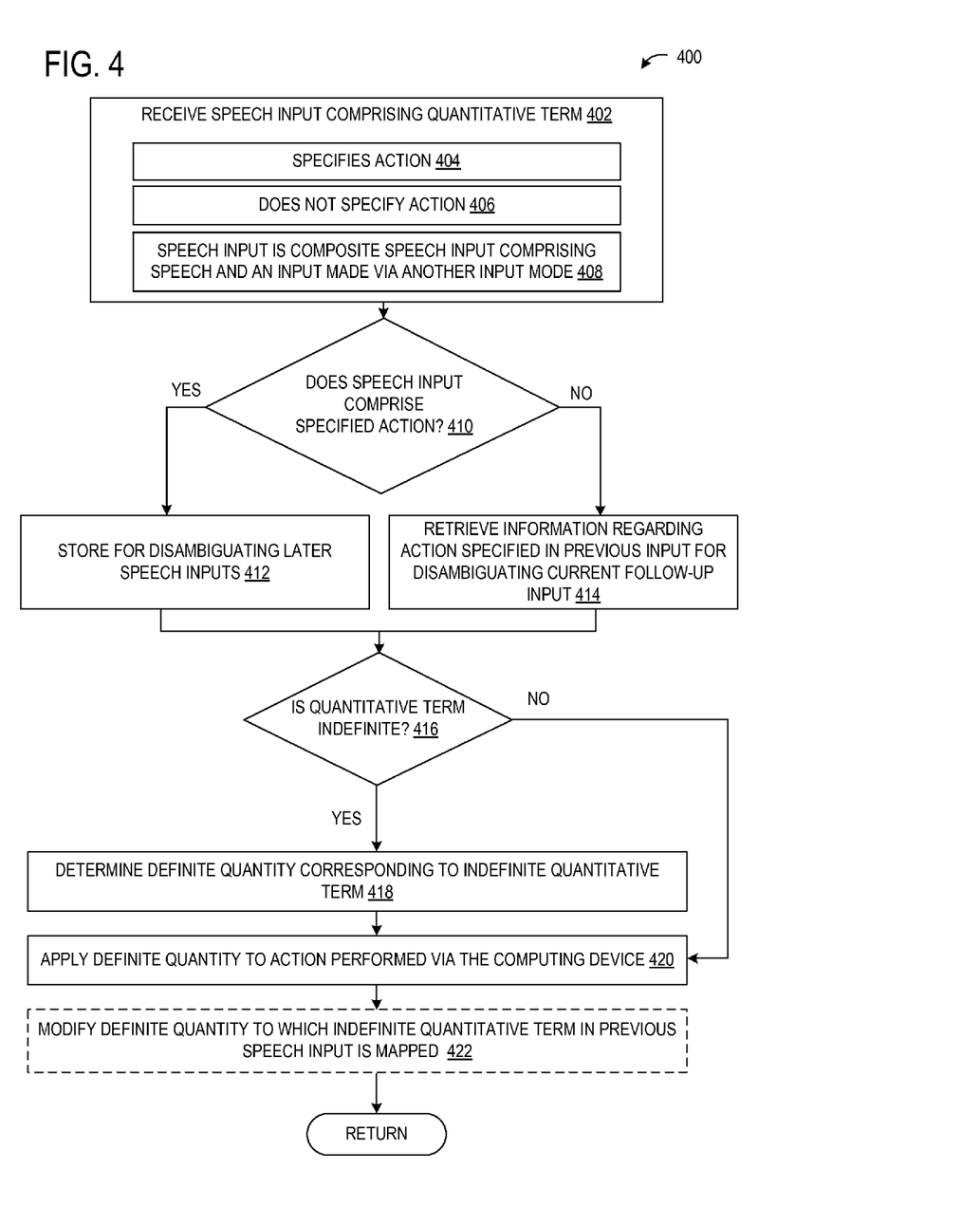
FIG. 4 shows a flow diagram depicting an embodiment of a method for determining an intent of an indefinite speech input.

FIG. 4 shows a flow diagram depicting an embodiment of a method 400 for disambiguating indefinite speech inputs. Method 400 comprises, at 402, receiving a speech input comprising a quantitative term. The speech input may be received, for example, from a speech identification module configured to identify speech segments from a microphone input. The speech input may specify an action, as shown at 404, or may not specify an action, as shown at 406. Further, the speech input may be a composite speech input that includes a speech portion and an input made via another input mode, as indicated at 408. Examples of other input modes include, but are not limited to, input from a two-dimensional image sensor, a depth sensor, a touch sensor, one or more sensors on a companion device (e.g. a smart phone, notepad computer, laptop computer, etc.).

Method 400 next comprises determining, at 410, whether the speech input comprises a specified action. If the speech input does comprise a specified action, method 400 may comprise storing information regarding the specified action for disambiguating follow-up speech inputs. For example, as described above, a user may make a first speech command, such as "increase the volume a little," followed by the follow-up command "a little more." Thus, by storing information regarding the command "increase the volume," the ambiguity regarding the action to be performed in response to the follow-up command may be resolved. Further, the mapping of the originally specified term "a little" may be changed to match the overall sum of the quantitative terms in the sequence of speech inputs to adapt the system to that user's particular expectations and intent.

On the other hand, if the speech input does not comprise a specified action, then method 400 comprises, at 414, retrieving stored information regarding an action specified in a previous input for use in disambiguating the current input.

Continuing, method 400 further comprises determining at 416, whether the quantitative term in the speech input is indefinite. If the quantitative term is not indefinite, then method 400 comprises, at 420 applying the definite quantity to an action performed via the computing device. On the other hand, if the quantitative term is indefinite, then method 400 comprises, at 418, determining a definite quantity corresponding to the indefinite quantitative term. The definite quantity may be determined in any suitable manner. For example, as mentioned above, indefinite quantitative terms may be mapped to definite quantities.

A same indefinite quantitative term may be mapped to different definite quantities for different contexts, such as for different applications, different modes within an application, different objects within an application, etc. As a more specific example, in a media player, the terms "a lot," "a little," and the like may be mapped to different quantities based upon whether the user is interacting with a volume control, a playback control (e.g. skip forward, skip backward, etc.), or another context. Further, indefinite quantitative inputs made via other modes also may be mapped to definite quantities. Examples include, but are not limited to, mid-air gesture inputs made via an image sensor, surface gesture inputs made via a touch sensor, non-gesture depth inputs (e.g. a posture input), non-speech audio inputs, inputs made via other devices (e.g. companion devices, remote control devices, other computing devices, etc.), and any other suitable input. It will be understood that mappings of indefinite quantitative terms to definite quantities may be stored locally and/or remotely, may be stored on a user-specific basis, and may be accessed in any suitable manner. Continuing with FIG. 4, method 400 comprises, after determining the definite quantity corresponding to the indefinite quantitative term, applying the definite quantity to an action performed via the computing device, as indicated at 420.

Method 400 further may comprise, at 422, modifying a definite quantity to which an indefinite quantitative term specified in a previous speech input is mapped based upon a follow-up speech input. In this manner, the speech system may adapt to user expectations and intent over time. This adaptation may be based on the behavior of a particular user, or based on the aggregated behavior of a population of users.

The above-described embodiments may allow a wide range of quantitative actions to be addressed via a relatively small, consistent set of indefinite quantitative inputs, whether speech, gesture, or other. Further, different meanings maybe specified to such quantitative inputs in each context in a manner that allows users to habituate to the use of the commands in each context. For example, "a little more" may signify 10% in a volume-setting context, and 50 pixels in a scrolling context. Further, while the qualifier inputs may be ambiguous in meaning, the mapping of the qualifier inputs to unambiguous, discrete commands allows users to learn an expected response to the qualifier inputs in each applicable setting. Likewise, by updating the mapping based upon input conversations (e.g. "scroll down a little" . . . "a little more"), the speech system may adapt to user intent.

In some embodiments, the methods and processes described above may be tied to a computing system of one or more computing devices. In particular, such methods and processes may be implemented as a computer-application program or service, an application-programming interface (API), a library, and/or other computer-program product.

Figure 5:
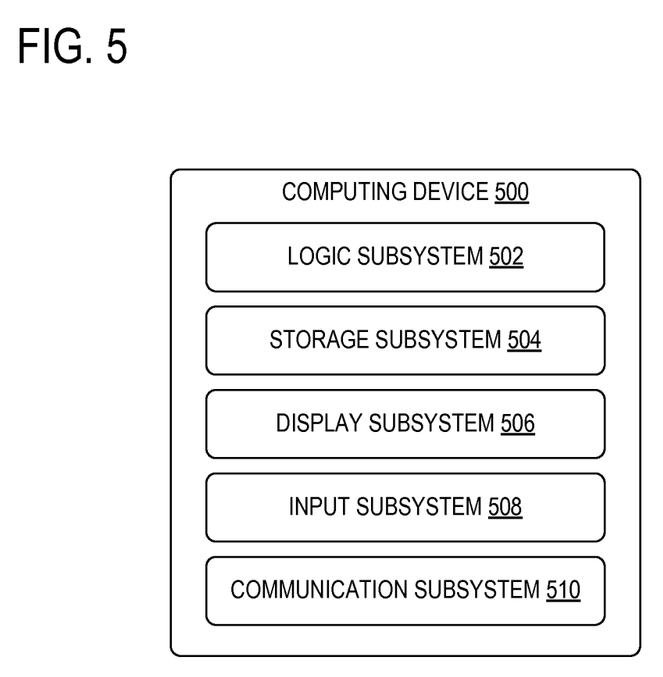
FIG. 5 shows a block diagram of an embodiment of a computing system.

FIG. 5 schematically shows a non-limiting embodiment of a computing system 500 that can enact one or more of the methods and processes described above. Computing system 500 is shown in simplified form. It will be understood that virtually any computer architecture may be used without departing from the scope of this disclosure. In different embodiments, computing system 500 may take the form of a mainframe computer, server computer, desktop computer, laptop computer, tablet computer, home-entertainment computer, network computing device, gaming device, mobile computing device, mobile communication device (e.g., smart phone), etc.

Computing system 500 includes a logic subsystem 502 and a storage subsystem 504. Computing system 500 may optionally include a display subsystem 506, input subsystem 508, communication subsystem 510, and/or other components not shown in FIG. 5.

Logic subsystem 502 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem may include one or more processors configured to execute software instructions. Additionally or alternatively, the logic subsystem may include one or more hardware or firmware logic machines configured to execute hardware or firmware instructions. The processors of the logic subsystem may be single-core or multi-core, and the programs executed thereon may be configured for sequential, parallel or distributed processing. The logic subsystem may optionally include individual components that are distributed among two or more devices, which can be remotely located and/or configured for coordinated processing. Aspects of the logic subsystem may be virtualized and executed by remotely accessible, networked computing devices configured in a cloud-computing configuration.

Storage subsystem 504 includes one or more physical devices configured to hold data and/or instructions executable by the logic subsystem to implement the methods and processes described herein. When such methods and processes are implemented, the state of storage subsystem 504 may be transformed—e.g., to hold different data.

Storage subsystem 504 may include removable media and/or built-in devices. Storage subsystem 504 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 504 may include volatile, nonvolatile, dynamic, static, read/write, read-only, random-access, sequential-access, location-addressable, file-addressable, and/or content-addressable devices.

It will be appreciated that storage subsystem 504 includes one or more physical devices. However, in some embodiments, aspects of the instructions described herein may be propagated by a pure signal (e.g., an electromagnetic signal, an optical signal, etc.) via a communications medium, as opposed to a storage medium. Furthermore, data and/or other forms of information pertaining to the present disclosure may be propagated by a pure signal.

In some embodiments, aspects of logic subsystem 502 and of storage subsystem 504 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

The terms "module," "program," and "engine" may be used to describe an aspect of computing system 500 implemented to perform a particular function. In some cases, a module, program, or engine may be instantiated via logic subsystem 502 executing instructions held by storage subsystem 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage subsystem 504. This visual representation may take the form of a graphical user interface (GUI). As the herein described methods and processes change the data held by the storage subsystem, and thus transform the state of the storage subsystem, the state of display subsystem 506 may likewise be transformed to visually represent changes in the underlying data. Display subsystem 506 may include one or more display devices utilizing virtually any type of technology. Such display devices may be combined with logic subsystem 502 and/or storage subsystem 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, steroscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of operating a computing device, the method comprising:

receiving a speech input comprising an indefinite quantitative term;

determining a mapping of the indefinite quantitative term to a first definite quantity;

applying the first definite quantity to an action performed via the computing device in response to the speech input;

receiving a follow-up speech input that requests performance of an additional quantity of the action performed; and modifying the mapping of the indefinite quantitative term to a second definite quantity based upon the follow-up speech input.

2. The method of claim 1, wherein the action is specified by the speech input, and wherein the indefinite quantitative term comprises a parameter for the action.

3. The method of claim 1, further comprising receiving a previous speech input and storing information regarding the previous speech input for use in disambiguating the follow-up speech input.

4. The method of claim 1, wherein the speech input comprises a composite speech input that further comprises an input received via a second input mode.

5. The method of claim 4, wherein the speech input comprises no specified action, and further comprising determining an action based on a state of an application currently in use.

6. The method of claim 1, wherein the action comprises an action performed to control playback of a media item.

7. The method of claim 1, wherein the action comprises an action performed to control the display of information.

8. A computing device, comprising:

a logic subsystem configured to execute instructions; and a data storage subsystem comprising instructions stored thereon that are executable by the logic subsystem to receive a speech input comprising an indefinite quantitative term, determine a mapping of the indefinite quantitative term to a first definite quantity, apply the first definite quantity to an action performed via the computing device in response to the speech input, receive a follow-up speech input that requests performance of an additional quantity of the action performed, and modify the mapping of the indefinite quantitative term to a second definite quantity.

9. The computing device of claim 8, wherein the action is specified by the speech input, and wherein the indefinite quantitative term comprises a parameter for the action.

10. The computing device of claim 8, wherein the speech input is a follow-up speech input that follows a previous speech input and that requests performance of an additional quantity of an action specified by the previous speech input.

11. The computing device of claim 10, wherein the instructions are further executable to modify a mapping of the indefinite quantitative term based upon the follow-up speech input.

12. The computing device of claim 8, wherein the speech input comprises a composite speech input that further comprises an input received via a second input mode.

13. A method of operating a computing device, the method comprising:

receiving a composite user input comprising a speech input and a non-speech input, one of the speech input and the non-speech input requesting an action and another of the speech input and the non-speech input providing an indefinite quantitative term related to the action requested;

determining a definite quantity corresponding to the indefinite quantitative term; and applying the definite quantity to an action performed in response to the speech input.

14. The method of claim 13, wherein the speech input requests the action and the non-speech input specifies the indefinite quantitative term.

15. The method of claim 14, further comprising receiving a follow-up input requesting an additional quantity of the action, and in response performing the additional quantity of the action and modifying a mapping of the indefinite quantitative term based upon the follow-up speech input.

16. The method of claim 15, wherein the follow-up input comprises a speech input.

17. The method of claim 13, wherein the non-speech input requests the action and the speech input specifies the indefinite quantitative term.

18. The method of claim 13, wherein the non-speech input comprises one or more of a gesture and a posture.

* * * * *